(12) United States Patent
Naito et al.

(10) Patent No.: US 12,275,174 B2
(45) Date of Patent: Apr. 15, 2025

(54) MELTING HEATER AND METHOD FOR MANUFACTURING MOLDED PRODUCT

(71) Applicant: THE JAPAN STEEL WORKS, LTD., Tokyo (JP)

(72) Inventors: Akihiro Naito, Tokyo (JP); Takashi Uemura, Tokyo (JP); Ryuki Sakamoto, Tokyo (JP); Shoso Nishida, Hiroshima (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 513 days.

(21) Appl. No.: 17/697,040

(22) Filed: Mar. 17, 2022

(65) Prior Publication Data

US 2022/0297361 A1    Sep. 22, 2022

(30) Foreign Application Priority Data

Mar. 18, 2021    (JP) ................. 2021-044363

(51) Int. Cl.
| | | |
|---|---|---|
| B29C 45/70 | (2006.01) | |
| B29C 45/16 | (2006.01) | |
| B29C 45/72 | (2006.01) | |
| B29C 65/70 | (2006.01) | |
| H05B 3/00 | (2006.01) | |
| H05B 3/26 | (2006.01) | |

(52) U.S. Cl.
CPC ...... B29C 45/1657 (2013.01); B29C 45/7207 (2013.01); B29C 65/70 (2013.01); H05B 3/0057 (2013.01); H05B 3/265 (2013.01); H05B 2203/032 (2013.01)

(58) Field of Classification Search
None
See application file for complete search history.

(56) References Cited

U.S. PATENT DOCUMENTS

| 5,793,017 A | 8/1998 | Yamada et al. |
| 2012/0090765 A1* | 4/2012 | Tailor ................. B29C 65/1467 156/86 |

FOREIGN PATENT DOCUMENTS

| JP | 8-156102 A | 6/1996 |
| JP | 8-162264 A | 6/1996 |
| JP | 9-502405 A | 3/1997 |
| JP | 2007-296700 A | 11/2007 |
| JP | 2015-116712 A | 6/2015 |
| JP | 2019-155775 A | 9/2019 |

OTHER PUBLICATIONS

Dommer DE4416518 A1 English Translation 1995 (Year: 1995).*

(Continued)

*Primary Examiner* — Jacob T Minskey
*Assistant Examiner* — Adrien J Bernard
(74) *Attorney, Agent, or Firm* — Sughrue Mion, PLLC

(57) ABSTRACT

A melting heater configured to melt joining end surfaces of a pair of semi-molded products in a case where the joining end surfaces are melted and joined to manufacture a molded product, the melting heater including: two glass plates arranged in parallel to each other; and a plurality of element heaters arranged in a unit having a flat plate shape as a whole between the two glass plates, in which the glass plate is subjected to surface processing for controlling infrared rays emitted from the plurality of element heaters.

16 Claims, 15 Drawing Sheets

(56) References Cited

OTHER PUBLICATIONS

Yamada JPH08162264 A English Translation, 1996 (Year: 1996).*
Yushimo JP2007296700 A English Translation, 2007 (Year: 2007).*
Yamamoto JP2019155775 A English Translation 2019 (Year: 2019).*
Office Action issued May 7, 2024 by the Japanese Patent Office in Japanese Patent Application No. 2021-044363.

* cited by examiner

MELTING HEATER AND METHOD FOR MANUFACTURING MOLDED PRODUCT

CROSS-REFERENCE TO RELATED APPLICATIONS

This application is based on and claims priority under 35 USC 119 from Japanese Patent Application No. 2021-044363 filed on Mar. 18, 2021, the contents of which are incorporated herein by reference.

TECHNICAL FIELD

The present disclosure relates to a melting heater used for melting joining end surfaces of a pair of semi-molded products made of resin when the joining end surfaces of the pair of semi-molded products are melted and joined to obtain a molded product, and a manufacturing method for manufacturing a molded product using a melting heater.

BACKGROUND

In order to manufacture a molded product by melting joining end surfaces of a pair of semi-molded products made of resin and pressure-bonding the joining end surfaces to each other, it is necessary to use a melting heater that melts the joining end surfaces. The melting heater is formed of a carbon heater and a halogen heater capable of heating the joining end surfaces in a non-contact manner in a short time. A shape of the carbon heater or the halogen heater is formed so as to fit a shape of the joining end surface, and the joining end surfaces can be efficiently melted. However, since the shape of the joining end surface is different for each type of molded product, the melting heater needs to be prepared for each type of molded product.

In contrast, JP-A-2015-116712 proposes a melting heater in which a carbon heater or a halogen heater is processed so as to have a flat plate shape. That is, the carbon heater or the halogen heater is bent a plurality of times so as to form a plurality of linear sections. The plurality of linear sections are arranged in parallel to each other at equal intervals and on the same plane. In this way, the melting heater is formed in a flat plate shape. The melting heater is inserted in a non-contact manner between a pair of semi-molded products arranged such that joining end surfaces thereof face each other. When the melting heater is swung, the joining end surfaces can be uniformly melted.

SUMMARY

The melting heater disclosed in JP-A-2015-116712 does not need to be formed according to a shape of the joining end surface. That is, there is no need to prepare a melting heater for each type of molded product, and the melting heater can be used for general purposes and is excellent. However, there is a problem that a portion to be melted other than the joining end surface is also heated and swung.

The present disclosure provides a melting heater capable of selectively heating a joining end surface of a semi-molded product, and a method for manufacturing a molded product.

Other problems and novel features will become apparent from description of the present specification and the accompanying drawings.

The melting heater includes two glass plates arranged in parallel to each other and a plurality of element heaters provided between the two glass plates. The plurality of element heaters are arranged in a unit having a flat plate shape as a whole. The glass plate is subjected to surface processing for controlling infrared rays emitted from the plurality of element heaters.

According to the present disclosure, the joining end surface can be selectively heated and melted without melting other portions.

DETAILED DESCRIPTION

Figure 1:
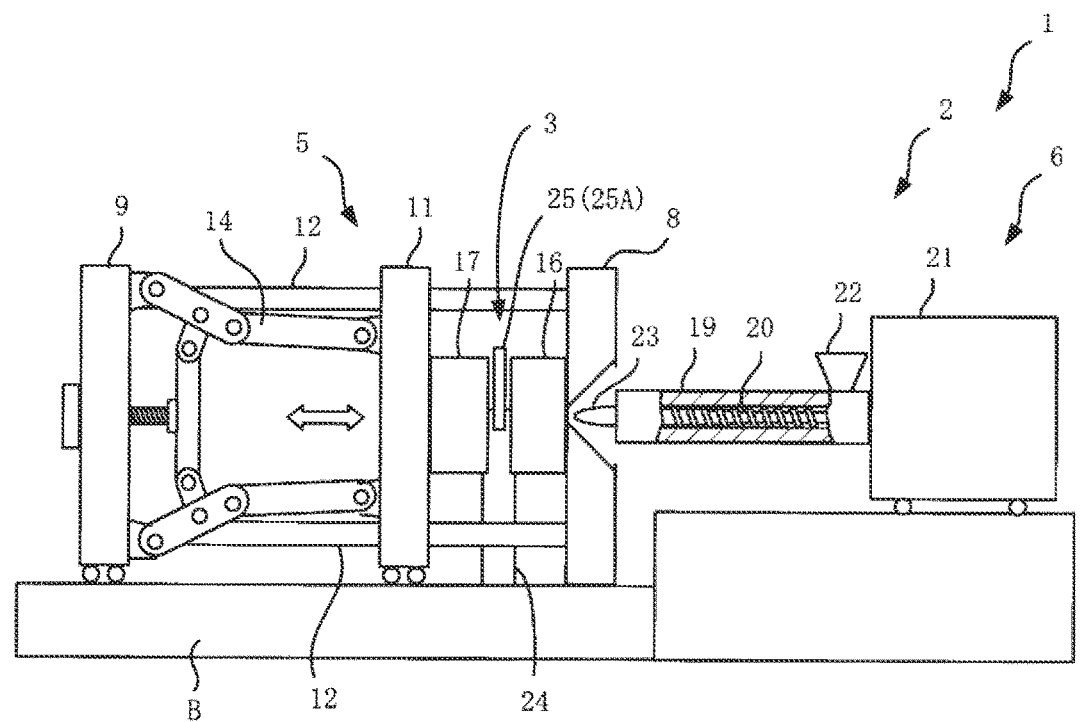
FIG. 1 is a front view showing a part of an injection molding machine and a heater device, which correspond to a manufacturing device according to the present illustrative embodiment.

Hereinafter, specific illustrative embodiments will be described in detail with reference to the drawings. However, the present disclosure is not limited to the following illustrative embodiments. The following description and drawings are simplified as appropriate to clarify the explanation. In the drawings, the same elements are denoted by the same reference numerals, and repeated description thereof is omitted as necessary. In addition, hatching may be omitted to avoid complicating the drawings.

The present illustrative embodiment will be described.

<Manufacturing Device of Molded Product>

As shown in FIG. 1, a manufacturing device 1 of a molded product according to the present illustrative embodiment includes an injection molding machine 2 and a heater device 3 according to the present illustrative embodiment. As will be described later, a pair of semi-molded products are molded in the injection molding machine 2, joining end surfaces of the pair of semi-molded products are melted by the heater device 3, and then the semi-molded products are pressure-bonded to obtain a molded product.

<Injection Molding Machine>

The injection molding machine 2 according to the present illustrative embodiment includes a mold clamping device 5 and an injection device 6. The mold clamping device 5 includes a fixed platen 8 fixed on a bed B, a mold clamping housing 9 that slides on the bed B, and a movable platen 11 that slides on the bed B in the same manner. The fixed platen 8 and the mold clamping housing 9 are connected by a plurality of, for example, four tie-bars 12. The movable platen 11 is slidable between the fixed platen 8 and the mold clamping housing 9. A mold clamping mechanism 14 formed of a toggle mechanism is provided between the mold clamping housing 9 and the movable platen 11. The mold clamping mechanism 14 may be constituted by a direct pressure mold clamping cylinder.

The fixed platen 8 and the movable platen 11 are respectively provided with a fixed mold 16 and a movable mold 17 according to the present illustrative embodiment, and the mold clamping mechanism 14 is driven to open and close the molds 16, 17. The mold clamping housing 9 slides according to thicknesses of the molds 16, 17 to adjust a distance between the fixed platen 8 and the movable platen 11 when the molds are opened. These molds 16, 17 will be described later. The heater device 3 according to the present illustrative embodiment is arranged adjacent to these molds 16, 17, and is provided in a depth direction of a paper surface in FIG. 1.

The injection device 6 includes a heating cylinder 19, a screw 20 housed in the heating cylinder 19, and a screw drive device 21 that drives the screw 20. The heating cylinder 19 is provided with a hopper 22 and an injection nozzle 23. When a resin material is supplied from the hopper 22 by rotating the screw 20, the resin material is melted and weighed in the heating cylinder 19. When the screw 20 is driven in an axial direction, the molten resin is injected from the injection nozzle 23.

<Heater Device>

Figure 2:
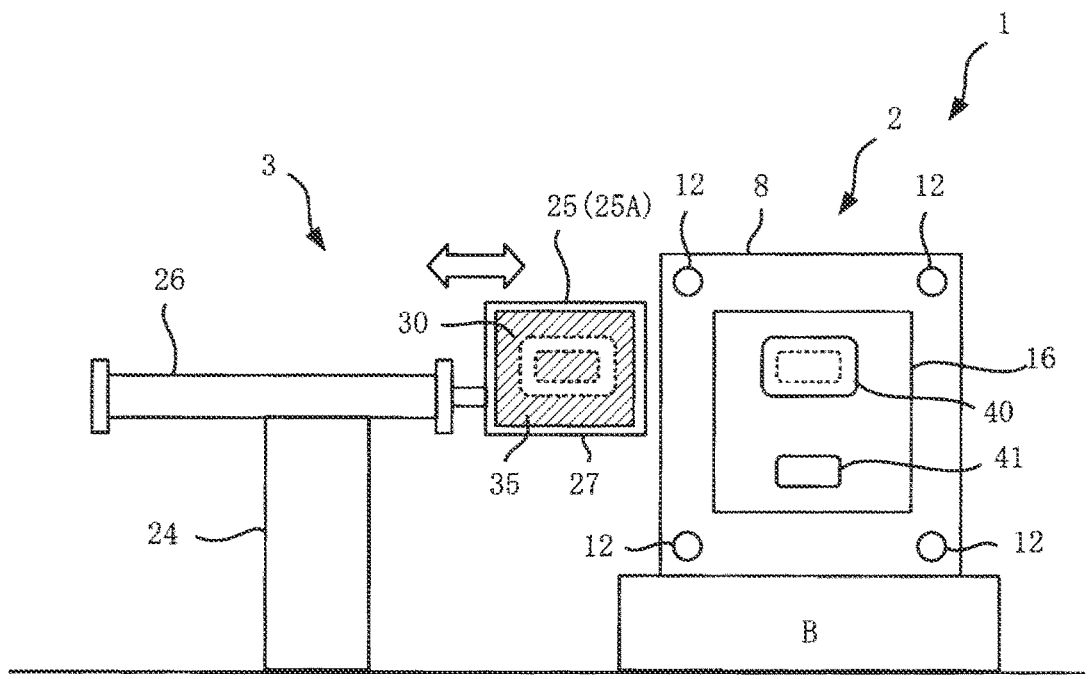
FIG. 2 is a side view showing a part of the injection molding machine and the heater device according to the present illustrative embodiment.

As shown in FIG. 2, the heater device 3 according to the present illustrative embodiment is provided on a side of the injection molding machine 2. The heater device 3 generally includes a melting heater 25 according to the present illustrative embodiment described below, a drive mechanism 26 that horizontally drives the melting heater 25, and a base 24 that supports the drive mechanism 26. The melting heater 25 can be driven in a direction of the mold 16 or retracted from the mold 16 by the drive mechanism 26. The heater device 3 is also provided with a power supply device that supplies power to the melting heater 25, but is not shown in FIG. 2.

<Melting Heater>

Figure 3:
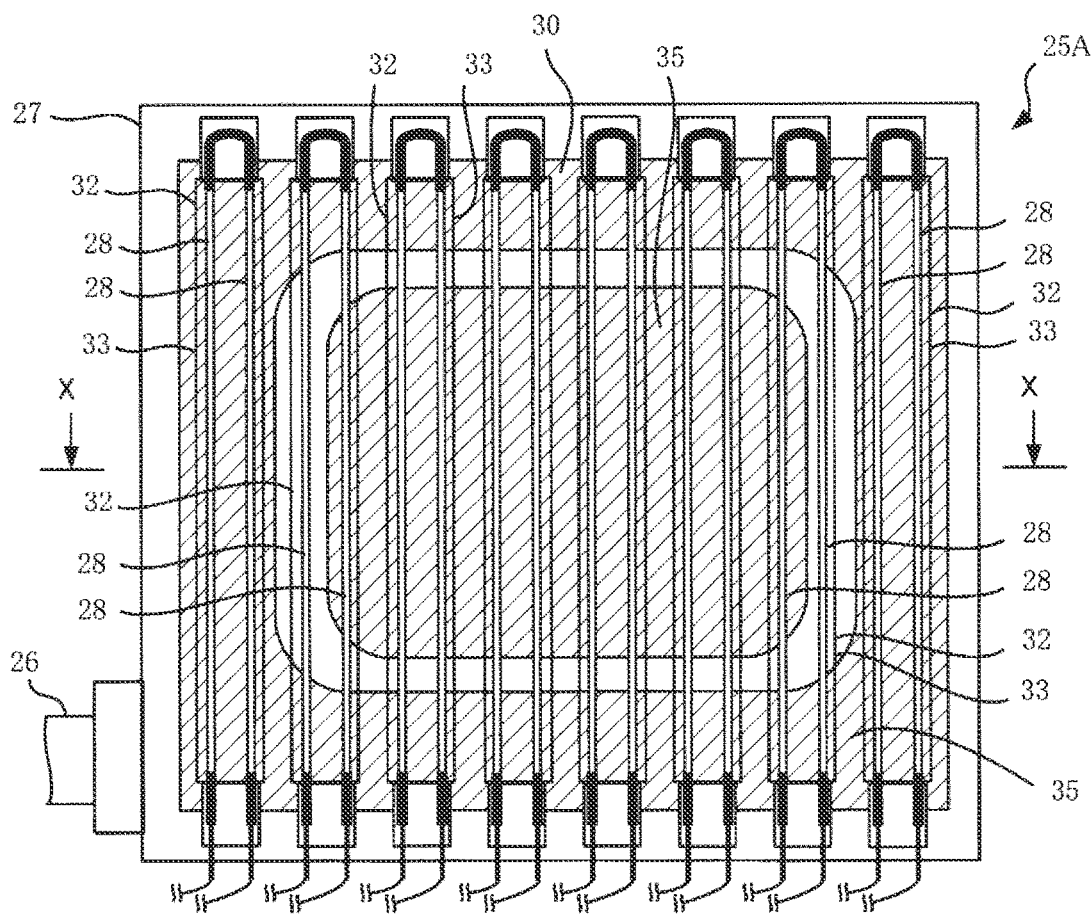
FIG. 3 is a front view of a melting heater according to a first illustrative embodiment.
Figure 4:
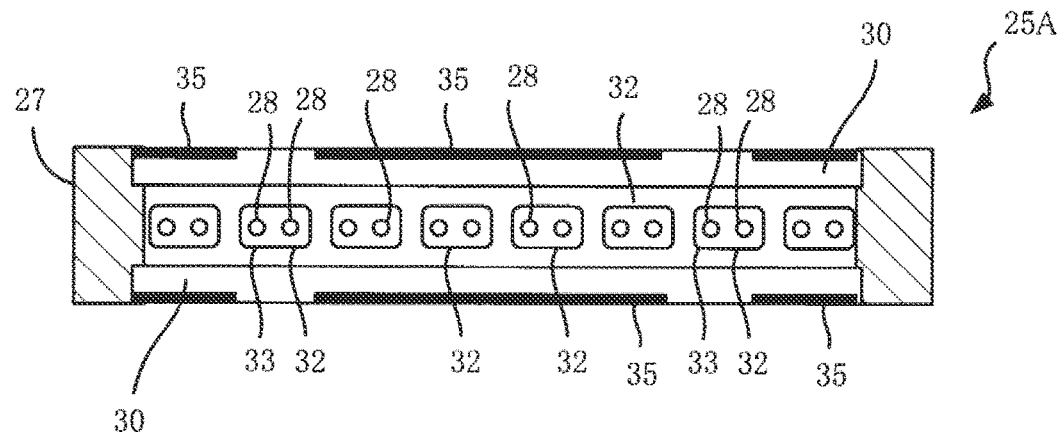
FIG. 4 is a top cross-sectional view of the melting heater according to the present illustrative embodiment taken along a line X-X in FIG. 3.

FIGS. 3 and 4 show a melting heater 25A according to a first illustrative embodiment of the present disclosure as the melting heater 25 according to the present illustrative embodiment. The melting heater 25A includes a rectangular frame body 27 made of metal, a plurality of linear element heaters 28 formed of carbon heaters, halogen heaters, or the like and configured to emit infrared rays and far infrared rays, and two glass plates 30, 30. The plurality of element heaters 28 are arranged in parallel to each other in the frame body 27 to form a unit having a flat plate shape as a whole. The two glass plates 30, 30 are provided on the frame body 27 so as to cover the plurality of element heaters 28.

Figure 5:
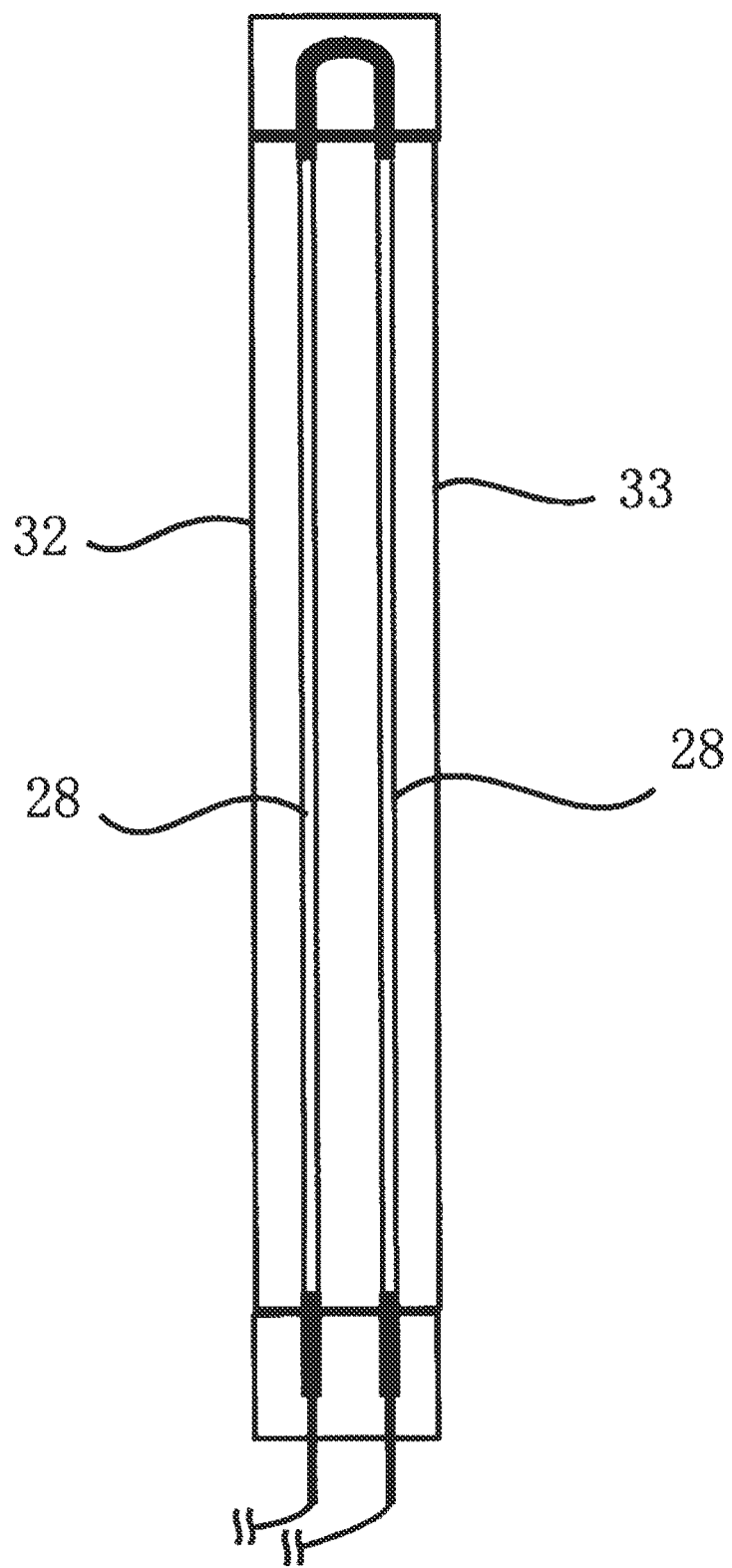
FIG. 5 is a front view showing a pair heater including a pair of element heaters.

To describe the first illustrative embodiment in more detail, each two of the element heaters 28 constitute a pair, that is, a pair heater 32. As shown in FIG. 5, the pair heater 32 includes a quartz glass tube 33 and two element heaters 28, 28 housed in the quartz glass tube 33. These element heaters 28, 28 are connected to each other at one end portions thereof. Therefore, when power is supplied from the other end portion, a current flows through the two element heaters 28, 28 in series. As shown in FIG. 3, such pair heaters 32 are provided vertically and arranged in parallel to each other at predetermined intervals in a horizontal direction.

In the first illustrative embodiment, when disconnection occurs in the element heaters 28, it is sufficient to replace only one disconnected element heater 28. Alternatively, it is sufficient to replace only the pair heater 32 including one pair of element heaters 28, 28. This is because it is not necessary to perform processing such as bending a shape of the element heaters 28 so as to fit a heating target. That is, the present disclosure has an effect of reducing a repair cost and facilitating management of a spare heater.

The melting heater 25A is characterized in that two glass plates 30, 30 are provided and that these glass plates 30, 30 are subjected to surface processing. The infrared rays from the plurality of element heaters 28, 28 are uniformly emitted in a plane, and the surface processing is applied in order to control the infrared rays. In the first illustrative embodiment, the surface processing is masking treatment of shielding or dimming the infrared rays. As will be described later, the masking treatment is applied in a predetermined pattern according to shapes of the joining end surface such that only the joining end surfaces of the semi-molded products can be selectively heated.

Specifically, in the present illustrative embodiment, film treatment is adopted as the masking treatment. That is, as shown by reference numerals 35 in FIG. 4, paint for light shielding is applied to surfaces of the glass plates 30. In addition, as the film treatment, plating or coating may be performed, or colored glass may be bonded. Further, the masking treatment may be sand treatment or edging treatment. That is, the surfaces of the glass plates 30, 30 may be subjected to the sand treatment and processed into a ground glass so that the infrared rays are scattered and dimmed in a predetermined pattern. By using the glass plate subjected to such masking treatment, even when a shape of the molded product is changed, a heating region of the heater can be easily changed only by replacing the glass plate with a glass plate subjected to masking treatment according to a pattern of a shape of the molded product.

In FIG. 3, electric wires provided in each of the plurality of element heaters 28 are omitted in the middle. These electric wires are connected to the power supply device (not shown), and are supplied with power at a necessary timing and irradiated with the infrared rays from the element heaters 28.

<Mold>

Figure 6:
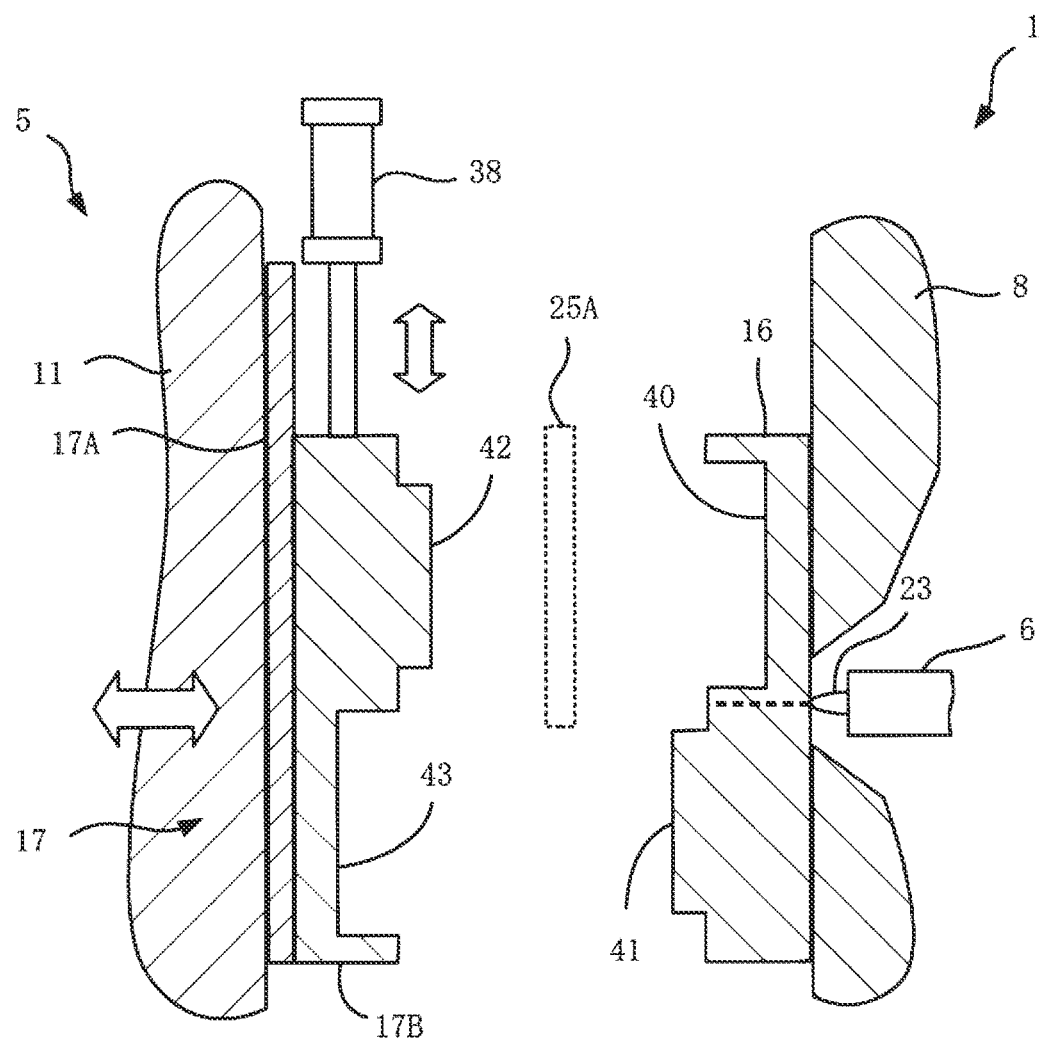
FIG. 6 is a front cross-sectional view showing molds, a part of the injection molding machine, and the melting heater according to the present illustrative embodiment, which correspond to a manufacturing device of the molded product according to the present illustrative embodiment.

The fixed mold 16 and the movable mold 17 according to the present illustrative embodiment will be described. As shown in FIG. 6, the injection nozzle 23 of the injection device 6 touches the fixed mold 16 from a rear surface thereof, and the resin is injected from the fixed mold 16. The movable mold 17 includes a fixed plate 17A fixed to the movable platen 11 and a slide mold 17B provided slidably with respect to the fixed plate 17A. The slide mold 17B is slid up and down by a piston cylinder unit 38. As will be described later, the slide mold 17B is slid to a molding position and a pressure-bonding position.

In the fixed mold 16 and the slide mold 17B, unevenness for molding the molded product are formed on parting lines thereof. That is, a first recess 40 is formed on an upper side of the fixed mold 16, and a first protrusion 41 is formed on a lower side of the fixed mold 16. A second protrusion 42 is formed on an upper side of the slide mold 17B, and a second recess 43 is formed on a lower side of the slide mold 17B. Therefore, when the slide mold 17B is set to a molding position and the molds 16, 17 are mold-clamped, a cavity is formed by the first recess 40 and the second protrusion 42, and a cavity is formed by the first protrusion 41 and the second recess 43.

<Method for Manufacturing Molded Product>

Figure 7A:
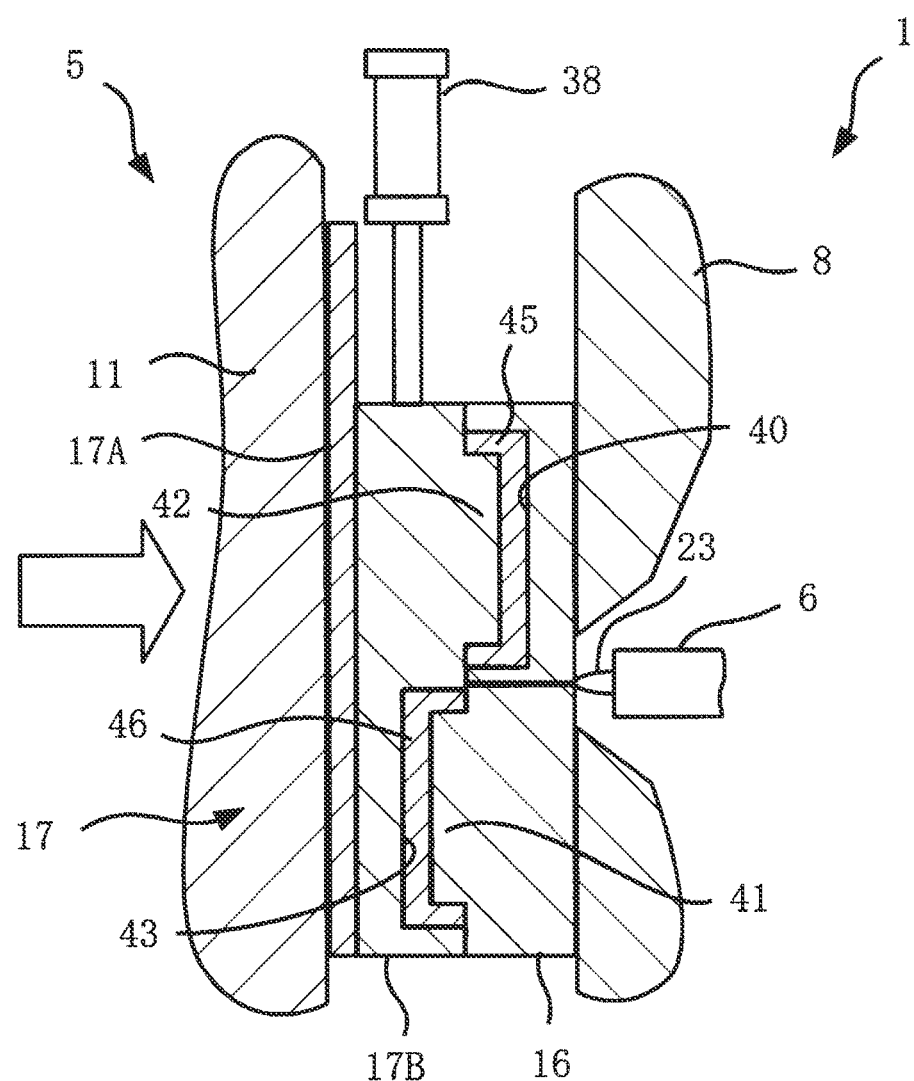
FIG. 7A is a front cross-sectional view showing the molds and a part of the injection molding machine according to the present illustrative embodiment in some steps of a method for manufacturing a molded product according to the illustrative embodiment of the present disclosure.

A method for manufacturing a molded product using the molded product manufacturing device 1 according to the present illustrative embodiment will be described. As shown in FIG. 6, the piston cylinder unit 38 is driven to slide the slide mold 17B downward. That is, the slide mold 17B is set to a molding position. The mold clamping device 5 is driven to perform mold clamping. Then, as shown in FIG. 7A, a cavity is formed by the first recess 40 of the fixed mold 16 and the second protrusion 42 of the slide mold 17B, and a cavity is formed by the first protrusion 41 of the fixed mold 16 and the second recess 43 of the slide mold 17B. Next, an injection molding step is performed. That is, resin is injected from the injection device 6. Then, first and second semi-molded products 45, 46 are molded.

Figure 7B:
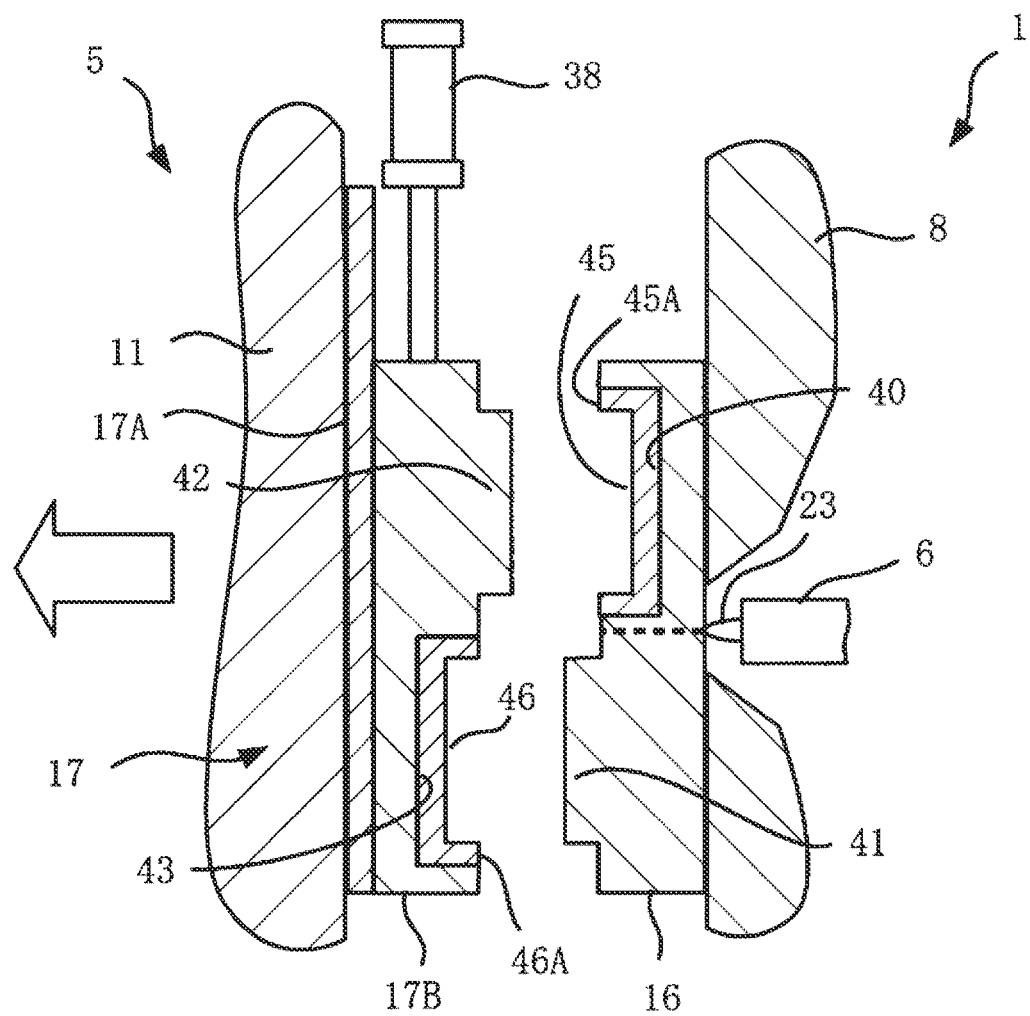
FIG. 7B is a front cross-sectional view showing the molds and a part of the injection molding machine according to the present illustrative embodiment in some steps of the method for manufacturing the molded product according to the illustrative embodiment of the present disclosure.

A mold opening step is performed after the first and second semi-molded products 45, 46 are cooled and solidified. Then, as shown in FIG. 7B, the first semi-molded product 45 and the second semi-molded product 46 are mold-opened while remaining in the fixed mold 16 and the slide mold 17B, respectively. Joining end surfaces 45A, 46A are formed on the first semi-molded product 45 and the second semi-molded product 46, respectively.

Figure 7C:
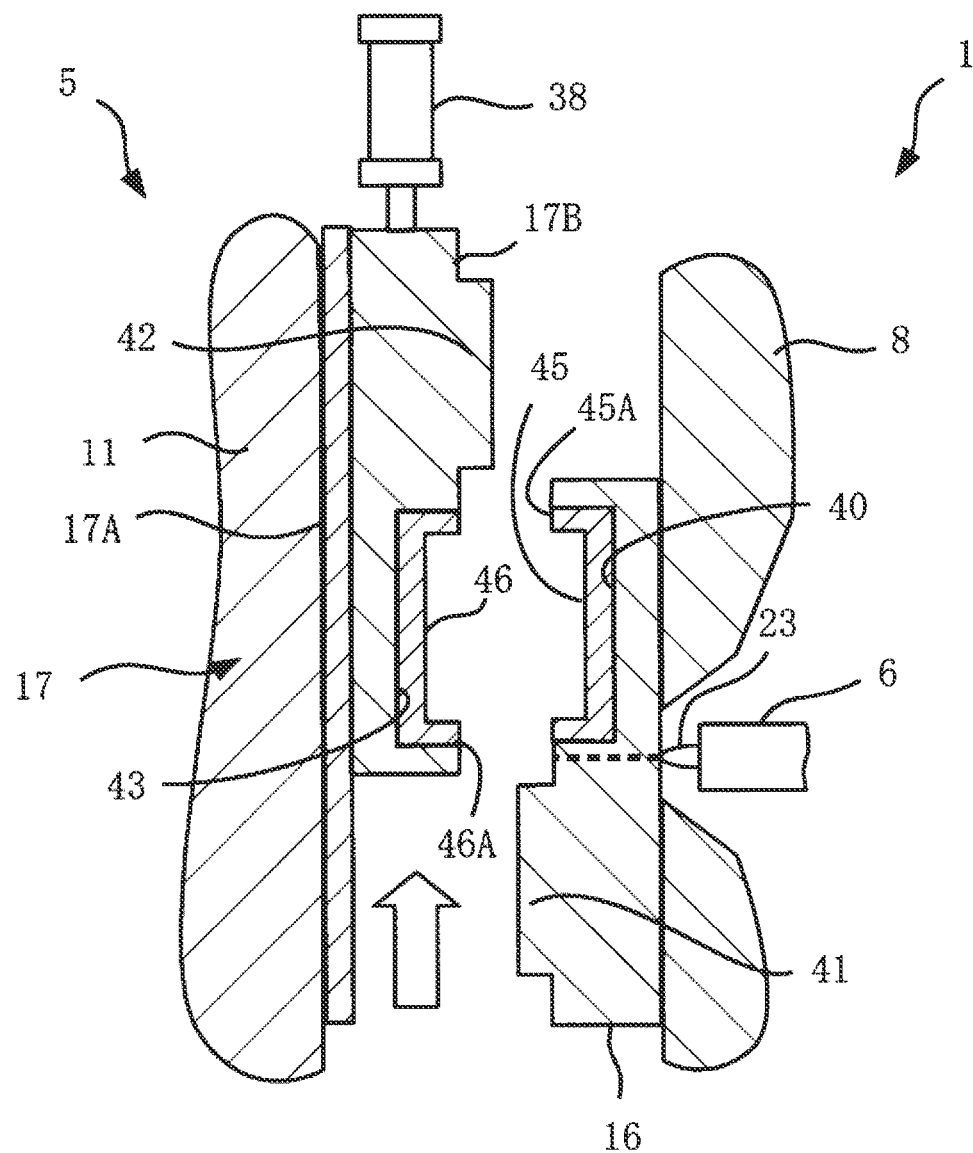
FIG. 7C is a front cross-sectional view showing the molds and a part of the injection molding machine according to the present illustrative embodiment in some steps of the method for manufacturing the molded product according to the illustrative embodiment of the present disclosure.

An aligning step is performed. That is, as shown in FIG. 7C, the piston cylinder unit 38 is driven to slide the slide mold 17B to a pressure-bonding position on an upper side. At this time, the joining end surfaces 45A, 46A of the first and second semi-molded products 45, 46 face each other. That is, aligning is performed.

Figure 7D:
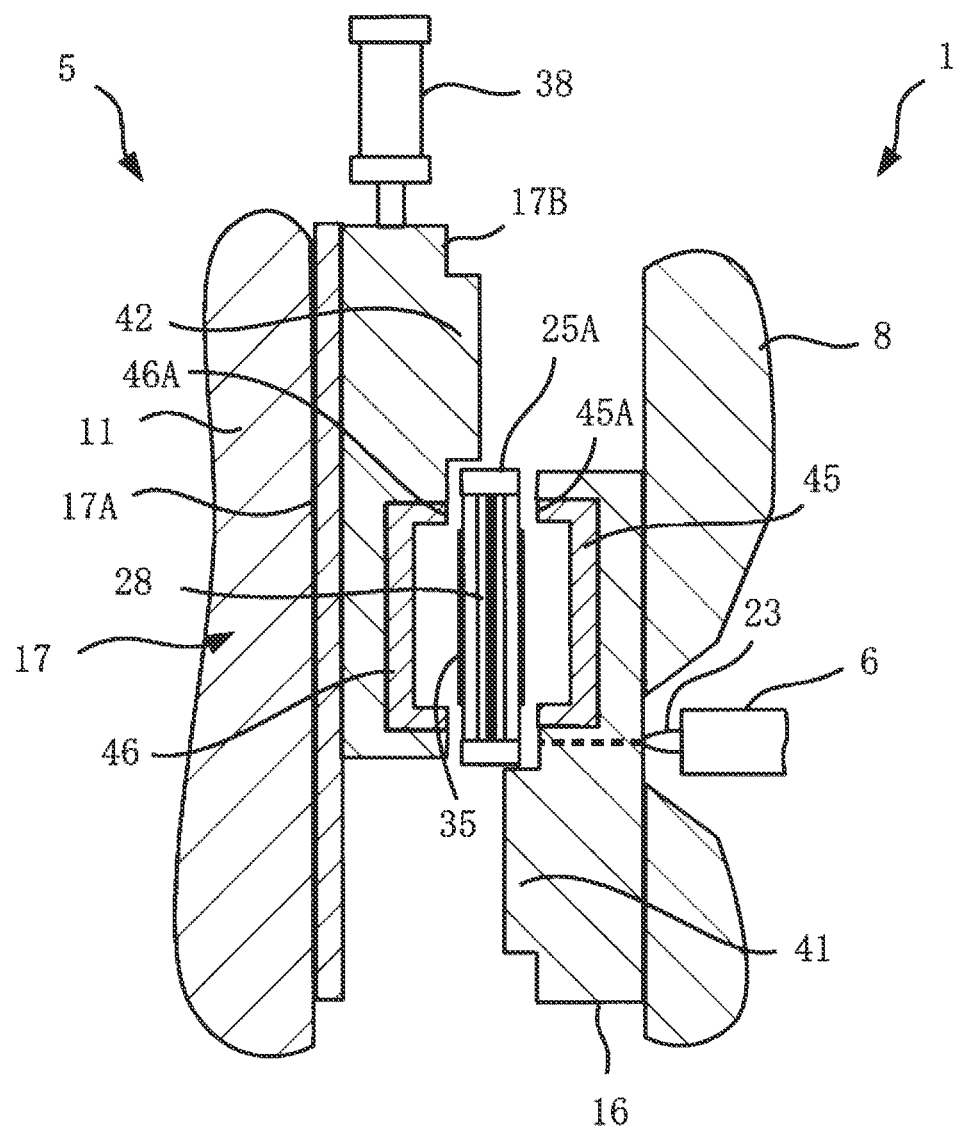
FIG. 7D is a front cross-sectional view showing the molds, a part of the injection molding machine, and the melting heater according to the present illustrative embodiment in some steps of the method for manufacturing the molded product according to the illustrative embodiment of the present disclosure.

A melting step is performed. That is, the drive mechanism 26 (see FIG. 2) is driven to insert the melting heater 25A according to the present illustrative embodiment between the first and second semi-molded products 45, 46 as shown in FIG. 7D. If necessary, a mold opening amount is adjusted by the mold clamping device 5 (see FIG. 1) to reduce a distance between the joining end surfaces 45A, 46A. However, the melting heater 25A maintains a non-contact state with respect to the joining end surfaces 45A, 46A. When a current is supplied to the plurality of element heaters 28 (see FIGS. 3 and 4), infrared rays are emitted. The infrared rays selectively irradiate the joining end surfaces 45A, 46A by masking treatment 35, 35 applied to the glass plates 30 to melt the bonding end surfaces 45A, 46A.

Figure 7E:
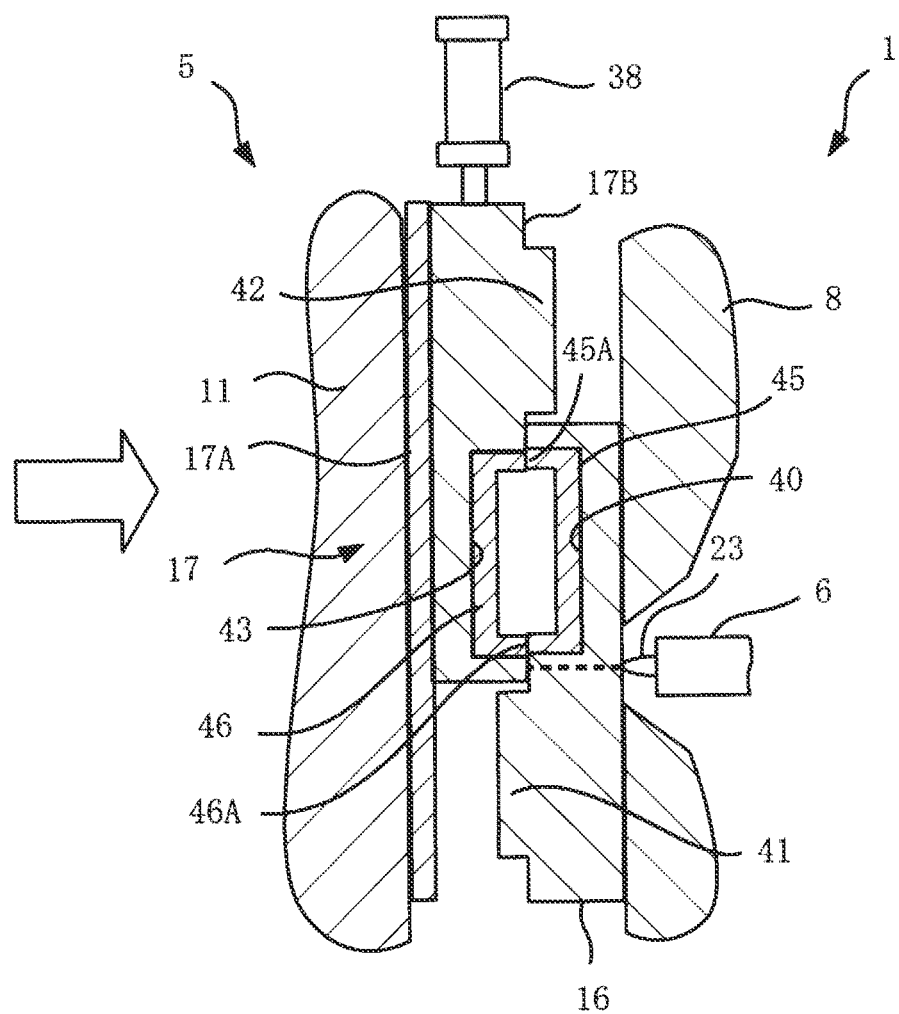
FIG. 7E is a front cross-sectional view showing the molds and a part of the injection molding machine according to the present illustrative embodiment in some steps of the method for manufacturing the molded product according to the illustrative embodiment of the present disclosure.
Figure 7F:
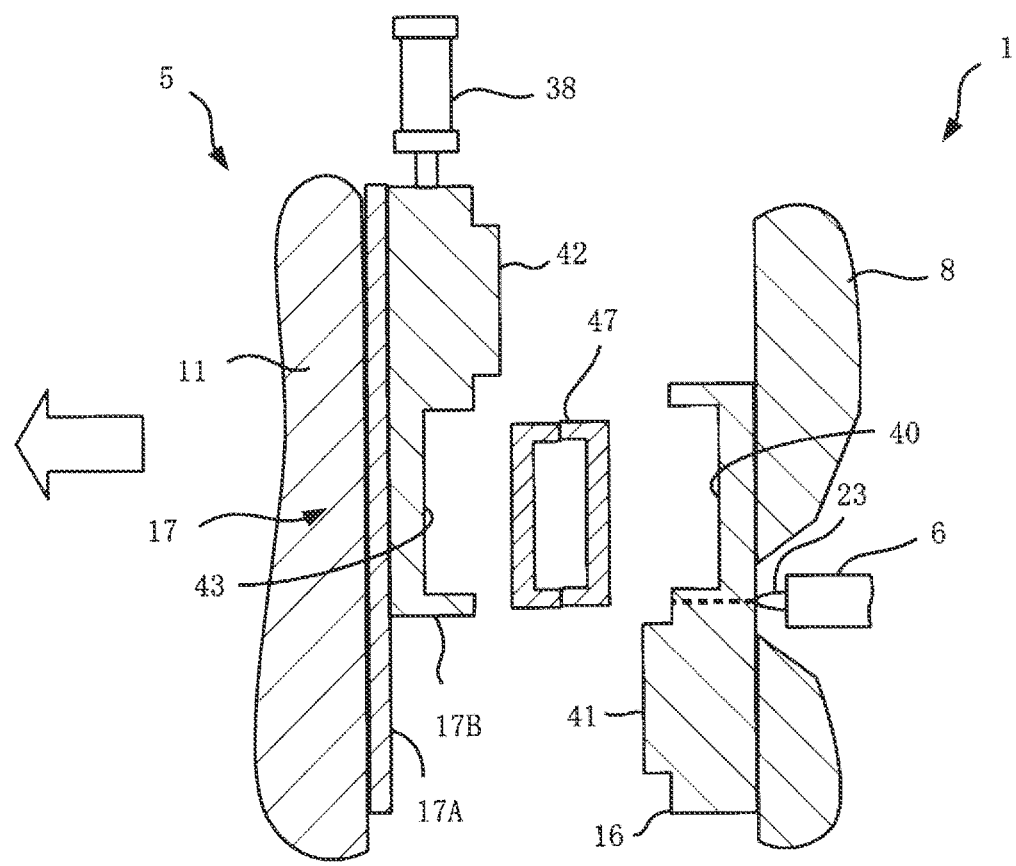
FIG. 7F is a front cross-sectional view showing the molds and a part of the injection molding machine according to the present illustrative embodiment in some steps of the method for manufacturing the molded product according to the illustrative embodiment of the present disclosure.

A pressure-bonding step is performed. That is, the drive mechanism 26 (see FIG. 2) is driven to retract the melting heater 25A. Next, as shown in FIG. 7E, the mold clamping device 5 is driven to close the molds. Then, the joining end surfaces 45A, 46A of the first and second semi-molded products 45, 46 are pressure-bonded to each other. That is, the joining end surfaces 45A, 46A are joined. When the mold clamping device 5 is driven to open the molds, a molded product 47 is obtained as shown in FIG. 7F.

Melting Heater According to Second Illustrative Embodiment

Figure 8:
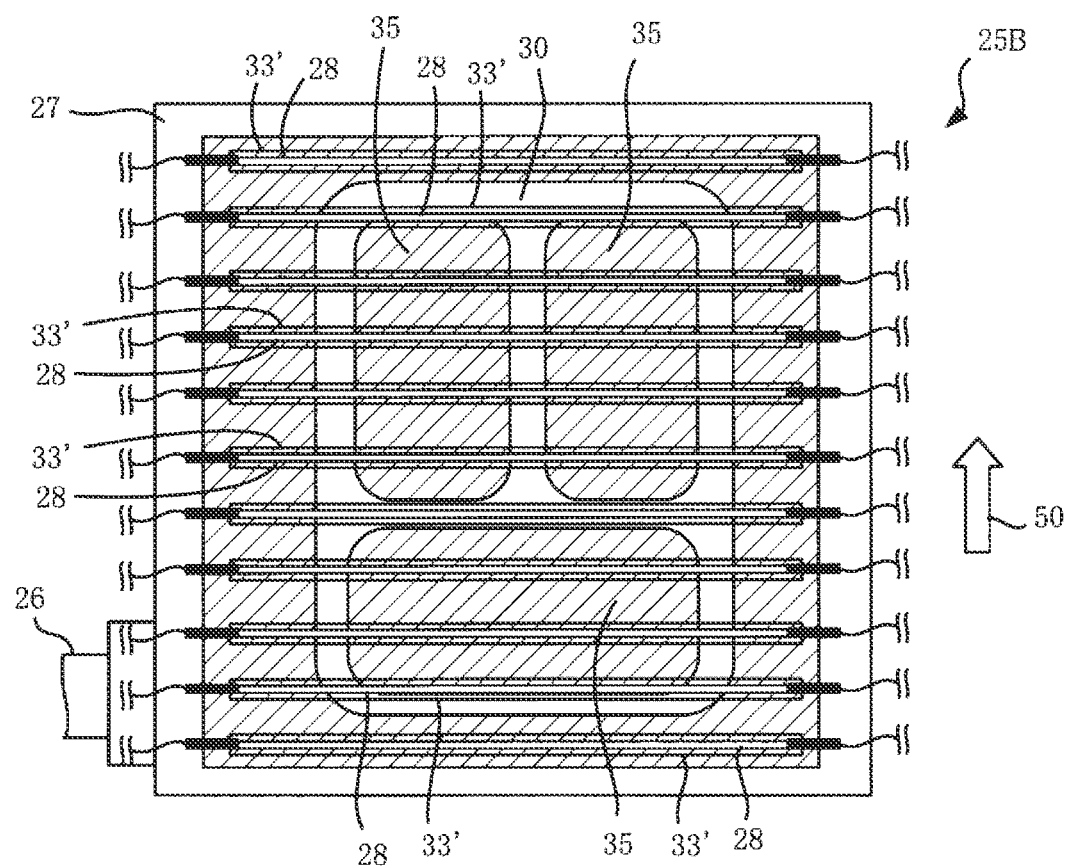
FIG. 8 is a front view of a melting heater according to a second illustrative embodiment of the present disclosure.

The melting heater 25 can be variously modified. FIG. 8 shows a melting heater 25B according to a second illustrative embodiment. In this illustrative embodiment, the plurality of element heaters 28 are not paired and are independent of each other. That is, each of the element heaters 28 is provided in each of quartz glass tubes 33'. The element heaters 28 are provided horizontally and arranged at equal intervals in an upper-lower direction.

A proportion of heating by the element heaters 28 due to radiation of infrared rays is most, and a proportion of heating by convection of air is also slight. Since the heated air rises as shown by a reference numeral 50 in FIG. 8, an upper side is more easily heated. Therefore, energization time of the element heaters 28 arranged on the upper side may be made shorter than that of the element heaters 28 arranged on a lower side, or a magnitude of the supplied current of the element heaters 28 arranged on the upper side may be made smaller than that of the element heaters 28 arranged on the lower side.

Melting Heater According to Third Illustrative Embodiment

Figure 9:
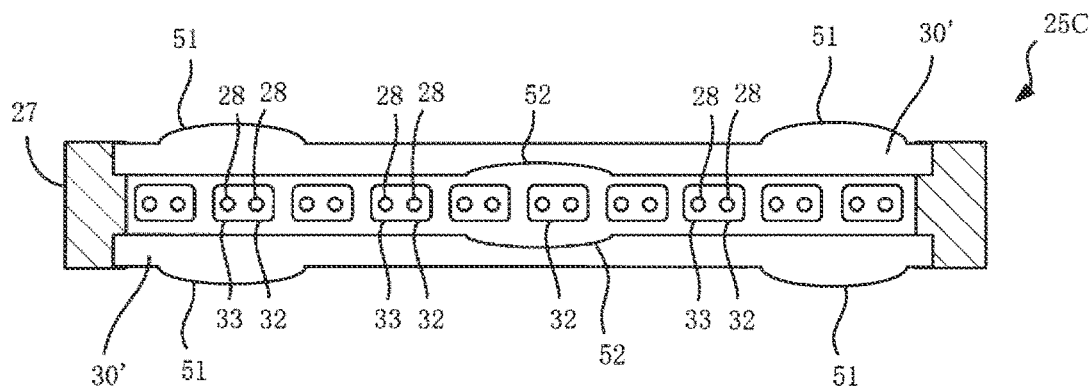
FIG. 9 is a top cross-sectional view of a melting heater according to a third illustrative embodiment of the present disclosure.

FIG. 9 shows a melting heater 25C according to a third illustrative embodiment. In this illustrative embodiment, surface processing applied to two glass plates 30', 30' is unevenness processing in which unevenness is formed on surfaces by partially changing plate thicknesses. Specifically, convex portions 51 and concave portions 52 are formed in the glass plates 30', 30'. Since such unevenness processing is applied, infrared rays emitted from the element heaters 28 are refracted. That is, light is condensed at the convex portion 51 and scattered at the concave portion 52. Thereby, the joining end surfaces 45A, 46A of the semi-molded products 45, 46 (see FIG. 7C) can be selectively heated.

Melting Heater According to Fourth Illustrative Embodiment

Figure 10:
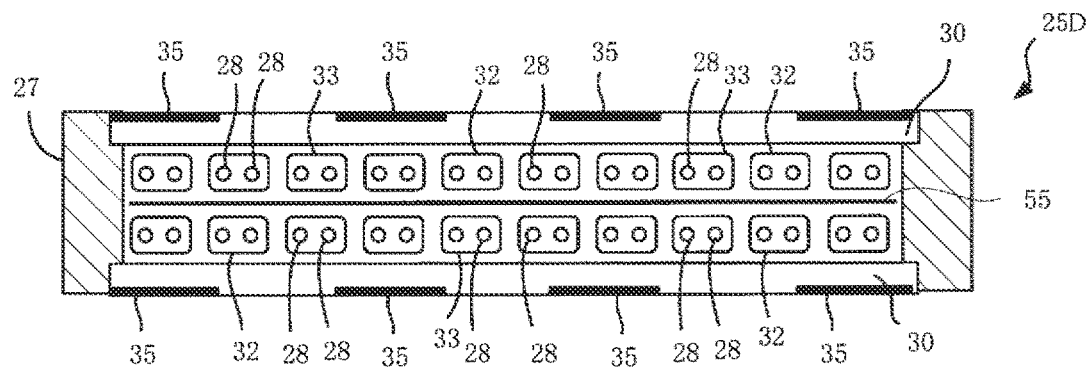
FIG. 10 is a top cross-sectional view of a melting heater according to a fourth illustrative embodiment of the present disclosure.

FIG. 10 shows a melting heater 25D according to a fourth illustrative embodiment. In this illustrative embodiment, the element heaters 28 are arranged in two layers including a first layer and a second layer. That is, a two-layer structure is formed. A reflective plate 55 is provided between the element heaters 28 in the first layer and the element heaters 28 in the second layer. The reflective plate 55 separates infrared rays from the element heaters 28 in the first layer and infrared rays from the element heaters 28 in the second layer, so that the infrared rays can be uniformly emitted to one glass plate 30 side and the other glass plate 30 side. The reflective plate 55 is not essential, and may be provided as necessary.

In some cases, a single injection molding machine 2 is provided with a plurality of injection devices 6 to mold semi-molded products 45, 46 having different colors or different resins. In this case, a difference in infrared absorption rate or melting temperature between the semi-molded product 45 and the semi-molded product 46 causes a difference in melting state between the semi-molded product 45 and the semi-molded product 46. Therefore, when both are heated to a temperature at which the two can be welded, resin melted first may start to decompose. In such a case, melting states of the semi-molded product 45 and the semi-molded product 46 may be adjusted by making a difference in energization time between the element heaters 28 arranged in the first layer and the second layer or making a difference in magnitude of the supplied current between the element heaters 28 arranged in the first layer and the second layer.

Melting Heater According to Fifth Illustrative Embodiment

Figure 11:
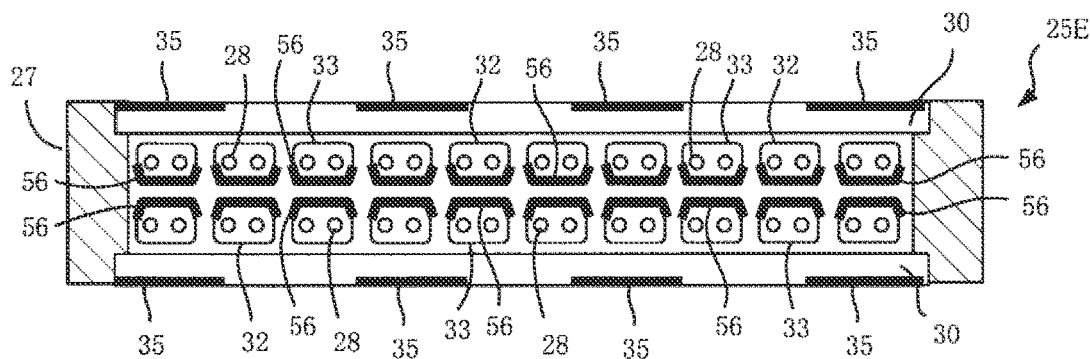
FIG. 11 is a top cross-sectional view of a melting heater according to a fifth illustrative embodiment of the present disclosure.

FIG. 11 shows a melting heater 25E according to a fifth illustrative embodiment. In this illustrative embodiment, as in the fourth illustrative embodiment, the element heaters 28 are arranged in a two-layer structure. In this illustrative embodiment, the quartz glass tubes 33 are coated with reflective films 56, respectively, on one surface by aluminum vapor deposition or the like. Thereby, the same effect as that of the reflective plate 55 in the fourth illustrative embodiment (see FIG. 10) can be obtained.

Melting Heater According to Sixth and Seventh Illustrative Embodiments

Figure 12:
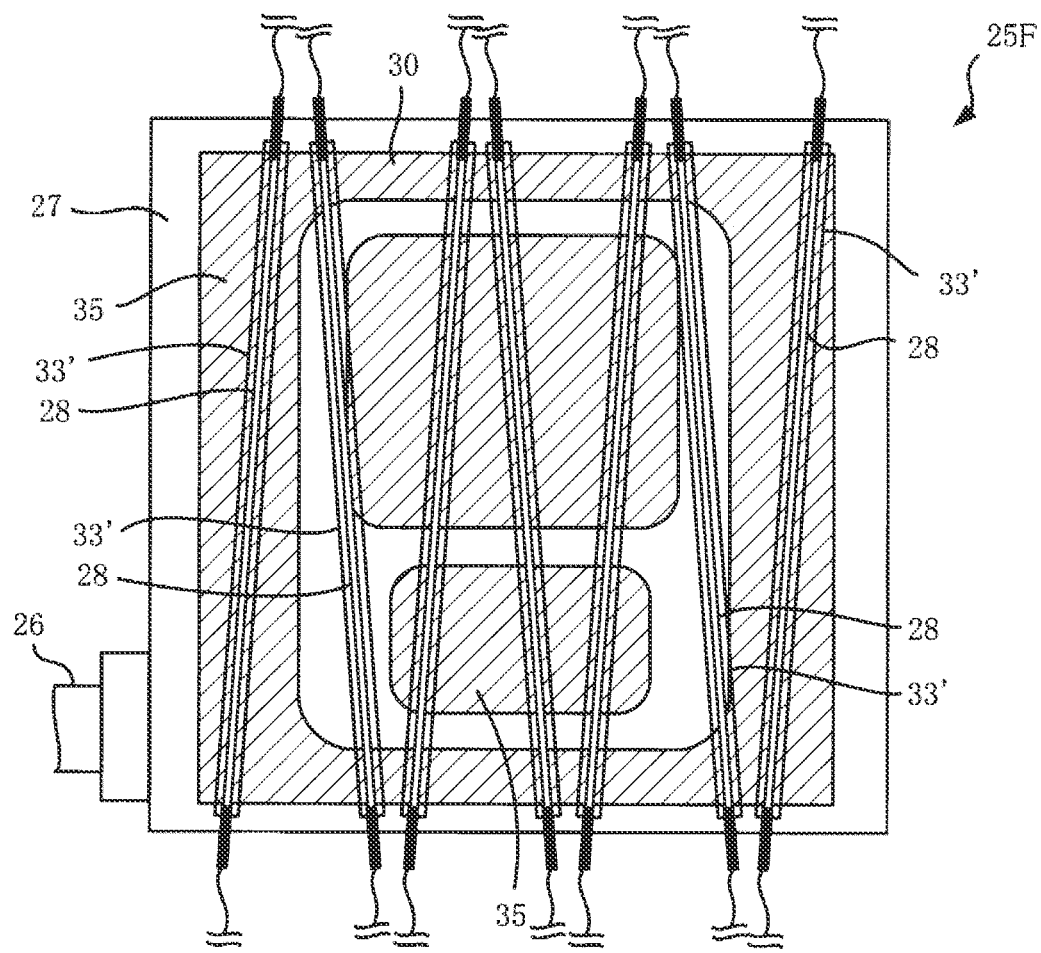
FIG. 12 is a top cross-sectional view of a melting heater according to a sixth illustrative embodiment of the present disclosure.
Figure 13:
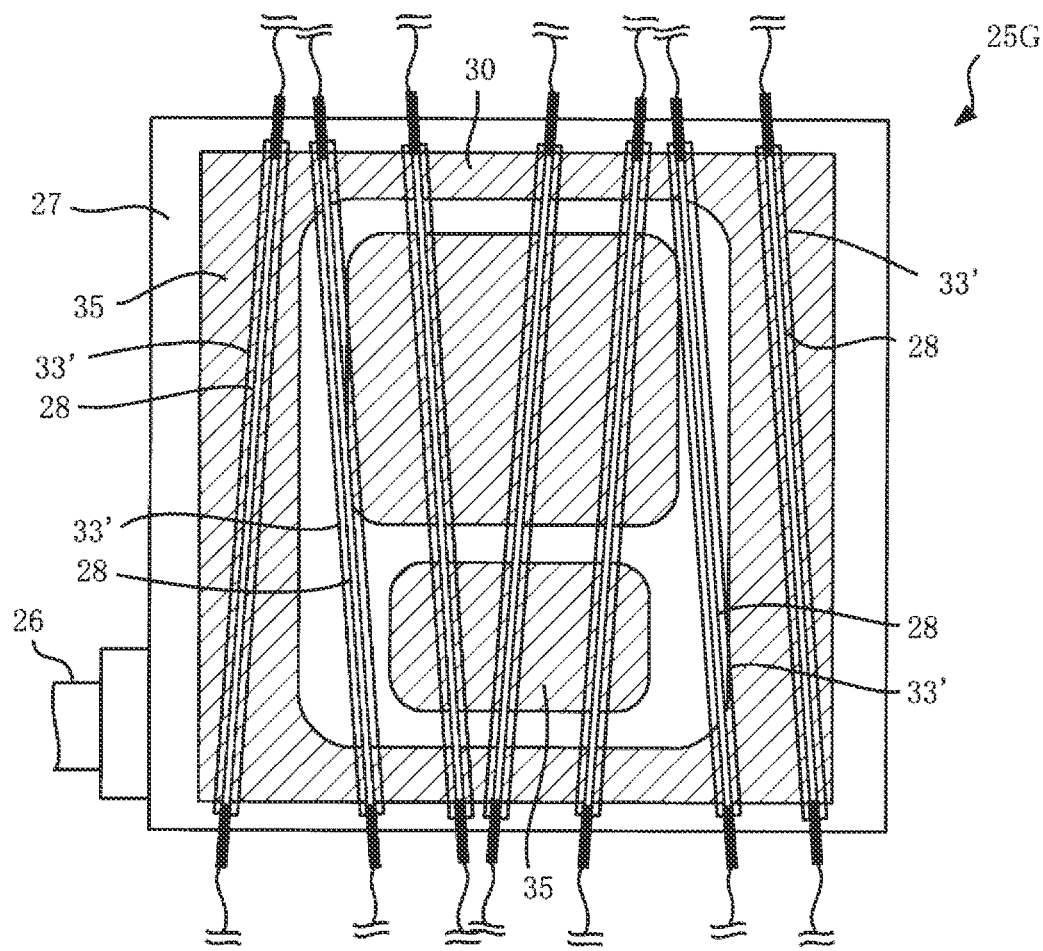
FIG. 13 is a top cross-sectional view of a melting heater according to a seventh illustrative embodiment of the present disclosure.

In the melting heater 25 according to the present illustrative embodiment, a direction of arrangement of the element heaters 28 is not limited. Various modifications can be made, such as arranging a heater diagonally, or arranging the element heaters 28 bent a necessary minimum number of times in a part or the whole of the element heaters 28. As such modifications, FIGS. 12 and 13 show a melting heater 25F according to a sixth illustrative embodiment and a melting heater 25G according to a seventh illustrative embodiment.

Melting Heater According to Eighth Illustrative Embodiment

Figure 14:
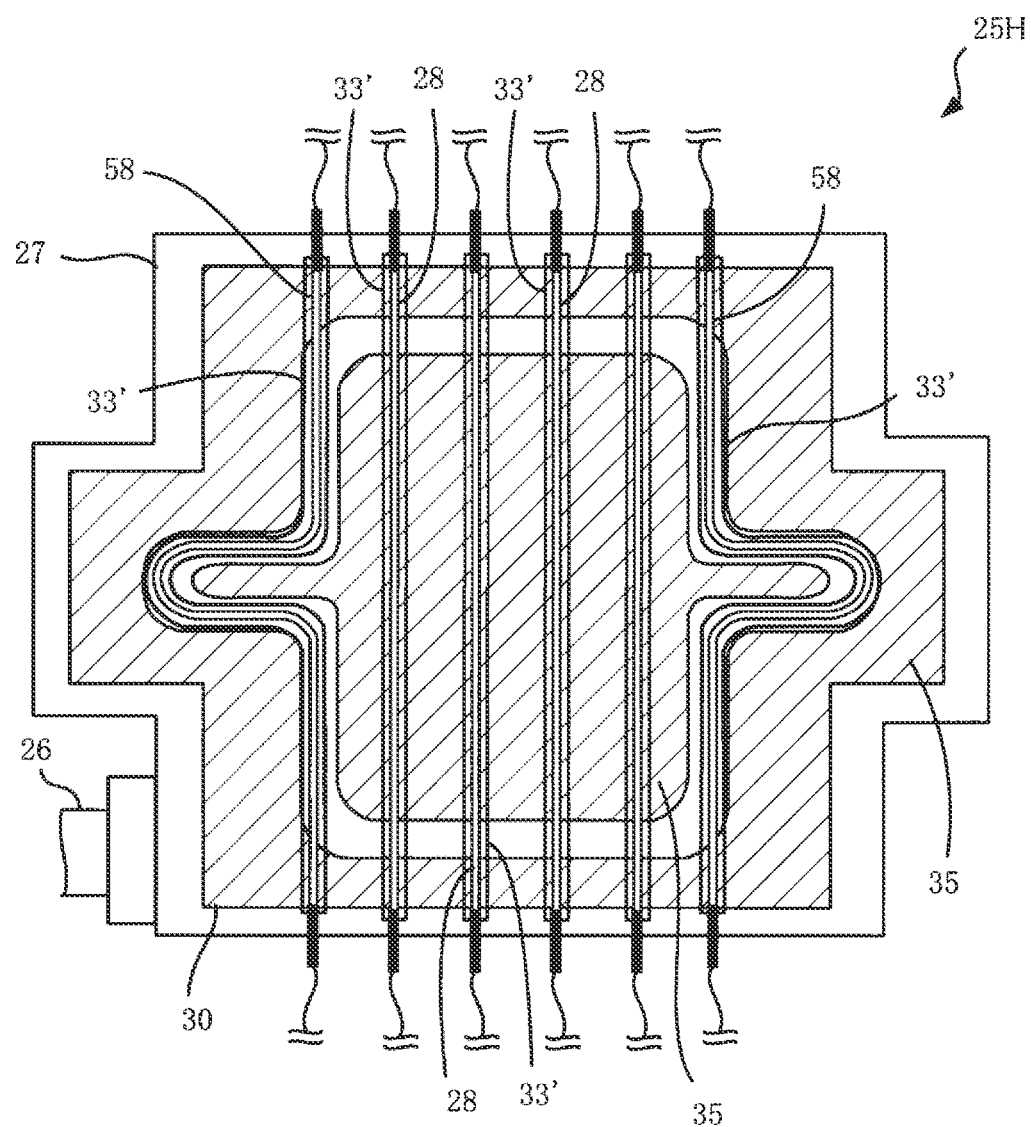
FIG. 14 is a top cross-sectional view of a melting heater according to an eighth illustrative embodiment of the present disclosure.

FIG. 14 shows a melting heater 25H according to an eighth illustrative embodiment. In this illustrative embodiment, a welded portion of a molded product has a shape partially protruding laterally at both side portions. The frame body 27 and the glass plate 30 also have shapes protruding laterally according to the shape of the welded portion. In this illustrative embodiment, the element heaters 28 are also provided, and curved heaters 58 whose shapes are deformed so as to correspond to laterally protruding portions are also employed. By employing the curved heaters 58, it is possible to cope with a complicated shape of the welded portion.

Although the disclosure made by the present inventor has been specifically described based on the illustrative embodiments, it is needless to say that the present disclosure is not limited to the illustrative embodiments described above, and various modifications can be made without departing from the scope of the disclosure. The plurality of examples described above can be implemented in combination as appropriate.

What is claimed is:

1. A melting heater configured to melt joining end surfaces of a pair of semi-molded products in a case where the joining end surfaces are melted and joined to manufacture a molded product, the melting heater comprising:
    two glass plates arranged in parallel to each other; and
    a plurality of element heaters arranged in a unit having a flat plate shape as a whole between the two glass plates,
    wherein the glass plate is subjected to surface processing corresponding to a shape of the joining end surfaces and is designed to control infrared rays emitted from the plurality of element heaters, the plurality of heaters selectively heating and melting the joining end surfaces while melting of other portions of the pair of semi-molded products is prevented.

2. The melting heater according to claim 1,
    wherein each of the plurality of element heaters has a linear shape; and
    wherein the plurality of element heaters is arranged in parallel to each other.

3. The melting heater according to claim 1,
    wherein the plurality of element heaters is horizontally provided.

4. The melting heater according to claim 1,
    wherein the surface processing is masking treatment of shielding, dimming, or scattering the infrared rays in a predetermine pattern corresponding to the shape of the joining end surfaces of the pair of semi-molded product.

5. The melting heater according to claim 1,
    wherein the surface processing is unevenness processing in which refraction of the infrared rays is adjusted by unevenness of a surface of the glass plate to condense or scatter the infrared rays.

6. The melting heater according to claim 1,
    wherein the plurality of element heaters is configured to individually control energization.

7. The melting heater according to claim 1,
    wherein adjacent two of the plurality of element heaters are connected in series as a pair, and
    wherein the plurality of element heaters is energized for each pair.

8. The melting heater according to claim 1,
    wherein the melting heater has a two-layer structure comprising a planar first layer and a planar second layer,
    wherein the planar first layer is formed of substantially half of the plurality of element heaters, and
    wherein the planar second layer is formed of the remaining number of element heaters.

9. The melting heater according to claim 8,
wherein a reflective member that reflects the infrared rays is provided between the first layer and the second layer.

10. The melting heater according to claim 8,
wherein each of the plurality of element heaters of the melting heater is subjected to surface treatment for reflecting the infrared rays on a surface on a side where the first layer and the second layer face each other.

11. A method for manufacturing a molded product, the method comprising:
injection molding a pair of semi-molded products by a pair of molds using a melting heater including two glass plates arranged in parallel to each other and a plurality of element heaters arranged in a unit having a flat plate shape as a whole between the two glass plates;
leaving one semi-molded product in one mold and leaving the other semi-molded product in the other mold;
aligning joining end surfaces of the pair of semi-molded products by bringing the joining end surfaces of the pair of semi-molded products close to each other and causing the joining end surfaces to face each other;
melting the joining end surfaces of the pair of semi-molded products by inserting the melting heater between the joining end surfaces of the pair of semi-molded products in a non-contact manner to melt the joining end surfaces; and
pressure-bonding the joining end surfaces of the pair of semi-molded products by retracting the melting heater, closing the molds, and pressure-bonding the joining end surfaces to each other,
wherein the glass plate is subjected to surface processing corresponding to a shape of the joining end surfaces and is designed to control infrared rays emitted from the plurality of element heaters, the plurality of heaters selectively heating and melting the joining end surfaces while melting of other portions of the pair of semi-molded products is prevented.

12. The method for manufacturing the molded product according to claim 11,
wherein each of the plurality of element heaters of the melting heater has a linear shape, and
wherein the plurality of element heaters of the melting heater is arranged in parallel each other.

13. The method for manufacturing the molded product according to claim 11,
wherein the plurality of element heaters of the melting heater is horizontally provided.

14. The method for manufacturing the molded product according to claim 11,
wherein the surface processing is masking treatment of shielding, dimming, or scattering the infrared rays in a predetermined pattern corresponding to the shape of the joining end surfaces of the pair of semi-molded product.

15. The method for manufacturing the molded product according to claim 11,
wherein the surface processing is unevenness processing in which refraction of the infrared rays is adjusted by unevenness of a surface of the glass plate to condense or scatter the infrared rays.

16. A melting heater configured to melt joining end surfaces of a pair of semi-molded products in a case where the joining end surfaces are melted and joined to manufacture a molded product, the melting heater comprising:
two glass plates arranged in parallel to each other; and
a plurality of element heaters arranged in a unit having a flat plate shape as a whole between the two glass plates,
wherein the glass plate is subjected to surface processing for controlling infrared rays emitted from the plurality of element heaters,
wherein the melting heater has a two-layer structure comprising a planar first layer and a planar second layer,
wherein the planar first layer is formed of substantially half of the plurality of element heaters,
wherein the planar second layer is formed of the remaining number of element heaters, and
wherein each of the plurality of element heaters of the melting heater is subjected to surface treatment for reflecting the infrared rays on a surface on a side where the first layer and the second layer face each other.

* * * * *